UNITED STATES PATENT OFFICE.

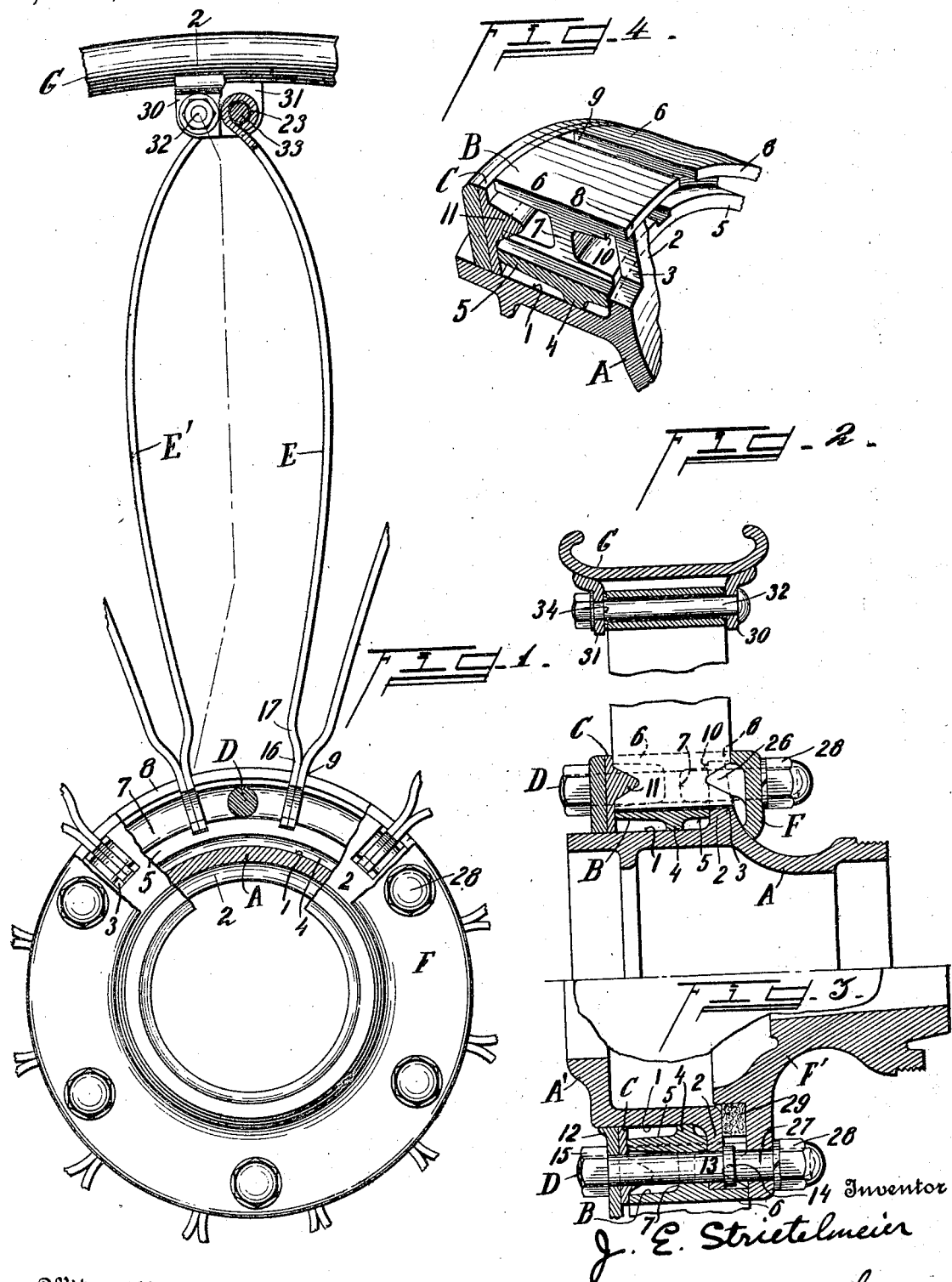

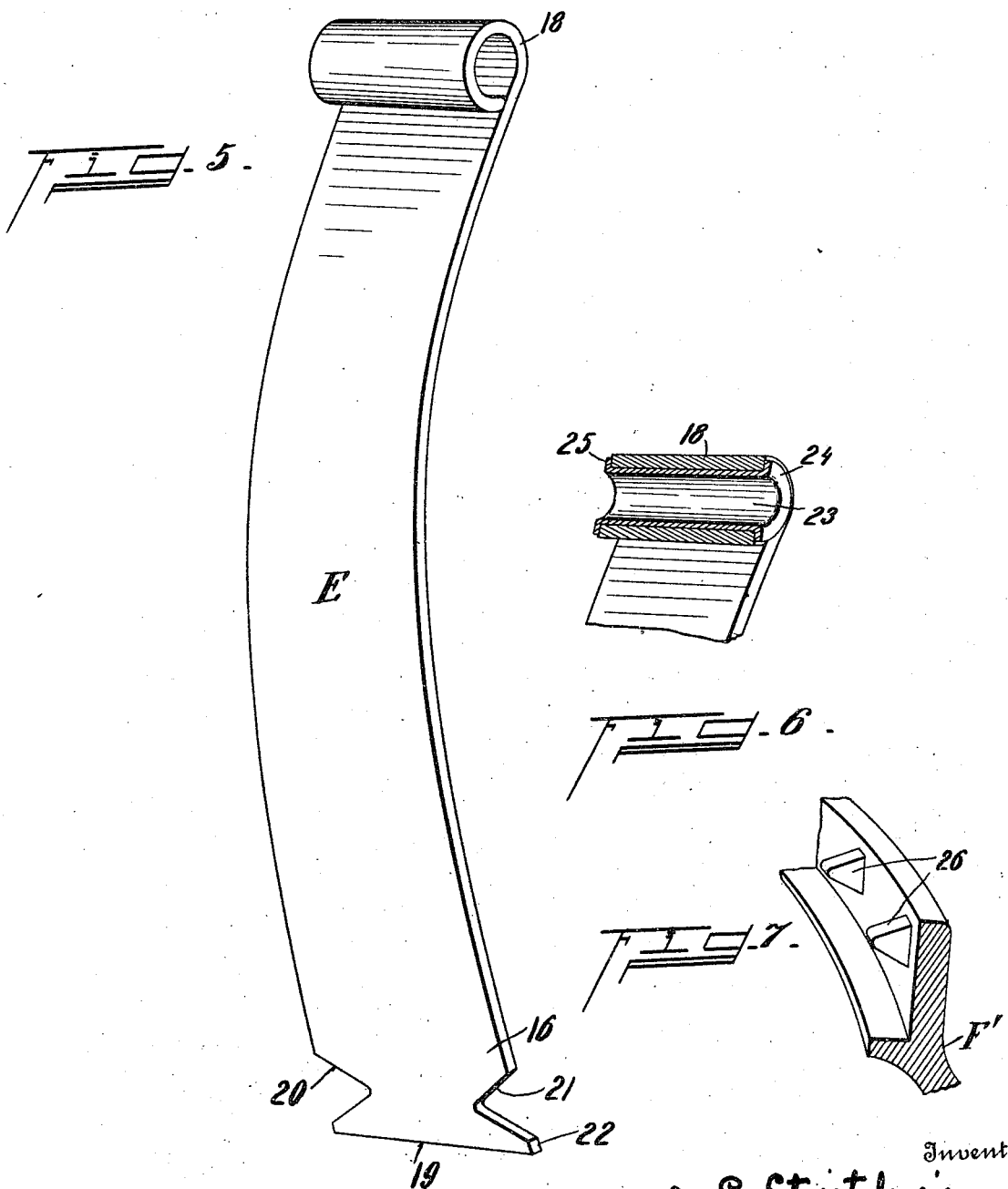

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

SPRING-WHEEL MECHANISM.

1,217,363.

Specification of Letters Patent. Patented Feb. 27, 1917.

Application filed December 4, 1913. Serial No. 804,606.

*To all whom it may concern:*

Be it known that I, JOHN E. STRIETELMEIER, a citizen of the United States, and residing at Cincinnati, in the county of Hamilton and State of Ohio, have invented a new and Improved Spring-Wheel Mechanism, of which the following specification is a full disclosure.

This invention deals with resilient wheels, and it proposes various improvements therein aiming to reduce the cost of manufacture, and at the same time obtain a very efficient organization.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a fragmentary side elevation partly in section showing one complete spoke element in its assembled relation with the other parts, constituting the wheel. Fig. 2 is a section through line 2—2, of Fig. 1, showing further details in the construction. Fig. 3 is a radial section showing the construction proposed for the rear hub of an automobile. Fig. 4 is a fragmentary perspective showing the form of the spoke-spacing element together with certain parts of the hub-element. Fig. 5 is a perspective view of one of the spoke-elements, which this invention contemplates as an independent article of manufacture, and Fig. 6 illustrates the eye of the same with its bushing in place. Fig. 7 is a fragmentary perspective of the retaining member.

For one of the elements of this combination, a hub-member such as indicated by A or by A' in Figs. 2 and 3, respectively, is proposed, and this member provides a peripheral seat 1 which extends to a flange-like portion 2 that may be located between the peripheral seat 1 and the outer end of the hub, as shown. At intervals around its periphery, this flange-like portion 2 may be provided with radial slots or notches 3 that open into its outermost peripheral edge, and which may receive the radial edges of the sheet metal spoke elements, and may also receive certain wedge-shaped teeth projecting from an annular retaining member, as will be subsequently explained.

Circumscribing the peripheral seat 1 is an annular spoke-spacer B, shaped as shown more clearly by Fig. 4. This member B may be seated on the annular seat 1 by means of an annular flange 4 to prevent the spacer B from moving eccentrically and the body portion of the spacer B may have an H-shaped section consisting of the annular base 5 and the concentric segments 6 which are united therewith by means of the intermediate web 7. The segments 6 are spaced apart forming slots 9 preferably sufficiently wide for the reception of two face-to-face spoke-portions, and these segments have their forward edge-portions 8 extending over the peripheral edge of the flange-like portion 2, and an annular shoulder 10 may be arranged to contact with the side face of said flange-like portion to determine the position of the spacer B. The slots 9 are in registering relation with the slots 3.

Coöperating with the spacer B is an annular collar C having a V-shaped rib 11 projecting laterally between its inner and outer peripheries into the annular space formed between the base 5 and the segments 6 of the spacer B. A brake-drum element 12 may be associated with the collar C and the above mentioned parts may be secured together by means of bolts D. These bolts preferably have the twofold office of not only securing these parts together, but also of detachably holding the retaining clamping member in place. Thus, the shank 13 of the bolt D passes through alined apertures in the flange 2, the web 7, the collar C and the brake-drum 12, being restrained against movement in one direction by the annular shoulder 14, and having the nut 15 exerting pressure in the opposite direction to clamp all of these parts together. This arrangement forms a hub-construction that retains its assembled relation and enables the spokes to be assembled or replaced without disassociating the above-mentioned hub parts.

The spokes are of the resilient type and have a loop-like form preferably being composed of two symmetrically related wide strips of sheet metal E and E' disposed edgewise to the plane of the wheel, and having their hub ends widely separated peripherally, and converging together, so that their rim ends are closely associated. They preferably terminate in the radial portions 16 and from this point either first take a slight ogee indicated by 17 in Fig. 1, or extend outwardly and follow a curve of progressively decreasing radius, and terminate in eyes 18 formed by bending the metal in a direction reverse to that of the general curve of the spoke element. Adjacent its innermost edge 19 this spoke-element is provided with two V-shaped notches 20 and 21, the edges of which are preferably angled at about 60°, and these notches are so located as to leave a strip of metal 22 of about three-sixteenths of an inch in width between the notches and the edge 19. The eye 18 is lined by a bushing 23 of brass or other composition metal terminating in annular flanges 24 and 25 at the end edges of the eye 18. These spoke-elements have their end portions seated in the slots 9 in the spoke-spacer B and the lower contacting surface of the rib 11 bears against the adjacent edge of the notch in each of the spoke-elements, so as to retain the same against radial outward movement, the spoke-spacer serving laterally to seat the spoke-elements and properly to space them apart in pairs.

The opposite notch of each spoke-element is engaged by a tooth 26 projecting laterally from a retaining member F which may be in the nature of an auxiliary collar, as shown by Fig. 2, or it may be extended to form an elementary portion of the hub, as indicated by F' in Fig. 3. The teeth 26 are preferably of such width that they may enter the slots 3 in the hub-member A or A' and engage each pair of spoke-elements in a manner similar to that of the rib 11. The members F and F' may be urged in place in any suitable manner as by means of axially extending nuts and bolts, but preferably the shank 13 of bolt D may be extended, as indicated by 27, and may pass through an aperture in the members F and F' and terminate in a nut 28. A slightly compressible packing 29 may be interposed between the members F' and A' to prevent the entry of dust.

The rim proposed herein may consist of a single annular piece of sheet steel G suitably configurated to receive a tire, and at intervals a pair of apertured ears 30 and 31 may be directed radially inward in parallelism with the plane of the wheel, and a pair of bolts 32 and 33, each terminating in a shoulder 34 bearing against one of said ears, serves pivotally to support the spring spoke-elements and secure the same to the rim.

Without further elaboration, the foregoing will so fully reveal the gist of this invention that others can by applying current knowledge readily adapt it for various applications without omitting certain features that from the standpoint of the prior art, fairly constitute essential characteristics of the generic or specific aspects of this invention, and therefore such adaptations should and are intended to be comprehended within the meaning and range of equivalency of the following claims.

Having thus described my invention, I claim as new and desire to secure by Letters Patent of the United States:—

1. A resilient wheel of the nature disclosed combining a hub-member provided with an annular flange having a series of radial slots, an annular-member having a series of teeth laterally projecting therefrom into said slots, a resilient flat-metal spoke-element configurated edgewise to engage one of said teeth, means coacting with said annular-member and with said hub-member for retaining said spoke-element against radial movement, a rim, and means securing said spoke-element thereto.

2. A resilient wheel of the nature disclosed combining a two-part hub comprising two hub-members adapted to telescope endwise, one of said hub-members provided with an annular flange having a series of slots extending radially, a series of teeth entering said slots, a spacer having a series of slots registering with said first series of slots, a series of sheet-metal resilient spoke-elements in said slots and having notches in one edge engaged by said teeth, means engaging the other edge of said spoke-elements, means urging said parts into tight fitting relation, a rim and means securing said spoke-elements thereto.

In witness whereof, I hereunto subscribe my name, as attested by the two subscribing witnesses.

JOHN E. STRIETELMEIER.

Witnesses:
  OLIVER B. KAISER,
  LOUISE A. BECK.